Nov. 27, 1962 R. VOLES 3,065,912
INTERPOLATING DEVICES
Filed Jan. 10, 1957 2 Sheets-Sheet 1

Inventor
R. Voles
By Glascott Downing Seebold
Attys.

Nov. 27, 1962

R. VOLES 3,065,912

INTERPOLATING DEVICES

Filed Jan. 10, 1957

$\dfrac{d}{T(1-T)}$

Inventor
R. Voles
By Glascock Downing Seebold,
Attys

United States Patent Office 3,065,912
Patented Nov. 27, 1962

3,065,912
INTERPOLATING DEVICES
Roger Voles, Chiswick, London, England, assignor to Electric & Musical Industries Limited, Hayes, Middlesex, England, a company of Great Britain
Filed Jan. 10, 1957, Ser. No. 633,479
Claims priority, application Great Britain Jan. 14, 1956
1 Claim. (Cl. 235—197)

This invention relates to interpolating arrangements. In the specification of United States Patent No. 2,928,604, there is described an interpolating device which comprises a series of contact studs connected by transformers so as to constitute a system having three degrees of freedom. The device has three input terminals to which, when the device is operating, alternating voltages are applied having amplitudes which are analogues of values of a function for three values of the variable of the function. In this way, three constraints are applied to the system and, as a consequence, the electromotive forces which are set up at the contact studs have amplitudes which represent values of one co-ordinate of a series of points on a quadratic curve drawn through the three points represented by the input function values and the corresponding values of the variable. In the arrangements described, the contact studs are arranged to be scanned by brush means which is rotated to represent the variable of the function and the device is arranged symmetrically so that the three input signals are required to correspond to three values of the variable, the intermediate one of which equally divides the interval between the other two. The interpolating device is intended primarily for use in automatic control equipment for machine tools and the function may, for example, represent displacements to be imparted in one co-ordinate direction, relating to one dimension of the machine, to a cutter, whilst the variable may represent displacement of a worktable in another co-ordinate direction. This may be referred to as geometric interpolation. However as explained in the complete specification of United States application, Serial No. 581,038, now Patent No. 2,929,555, it may sometimes be preferable to express displacements in different co-ordinate directions as functions of a common independent parameter common to all machine dimensions, say $t$ and this may be referred to as parametric interpolation. It implies the use of separate interpolating devices so that for each value of one co-ordinate derived by one interpolating device, a corresponding value of the other co-ordinate is derived by the other device. The interpolating device may then interpolate within unequally divided intervals, that is the three input signals to one interpolator and representing one co-ordinate need not correspond to an equally divided interval of another co-ordinate. The three input signals representing one or other co-ordinate must nevertheless correspond to an equally divided interval of the common parameter.

However in certain circumstances it may be desirable to effect interpolation with an interpolating device using a set of signals having the intervals between the corresponding values of the variable, with respect to which the interpolation is effected, in different ratio from that for which the interpolating device is adapted.

The object of the present invention is to enable the foregoing result to be obtained.

According to the present invention there is provided an interpolating arrangement comprising first, second and third input terminals; a plurality of output terminals; interpolating means interconnecting said input terminals and said output terminals, said interpolating means comprising two transformers intercoupling said input and output terminals, the turns ratios of said two transformers being predetermined for interpolation according to a quadratic function, in response to alternating signals applied to said input terminals and having amplitudes representing values of a function corresponding to three values of the variable of the function, the intervals between the first and second and between the second and third of which values of the variable are in predetermined ratio, whereby said interpolating means produces at said output terminals alternating signals, the amplitudes of which correspond to interpolated values of said function; a source of first, second and third alternating signals having amplitudes which represent respectively values of the function for three given values of the variable of said function, the interval between the first and second and between the second and third of which given values of the variable are in different ratio from said predetermined ratio; other transformer means comprising a plurality of transformers the turns ratios of which are predetermined to derive from the signals from said source a further alternating signal representing the value of said quadratic function for a value of said variable which divides in said predetermined ratio the interval between the first and third given values of the variable; and means for applying said first, said further and said third alternating signals to said first, second and third input terminals respectively.

In order that the invention may be clearly understood and readily carried into effect, the invention will be described with reference to the accompanying drawings in which.

Figure 1:
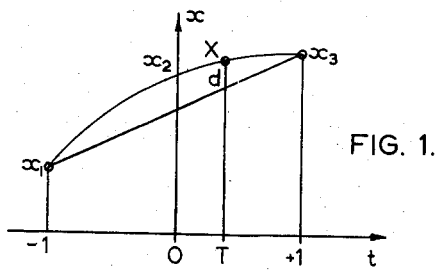
FIGURE 1 is a graph explanatory of the invention.

Referring to FIGURE 1, it will be assumed that three input voltages which are available for application to a quadratic interpolating device are $x_1$, X and $x_3$, corresponding to values of a variable $t$ of $-1$, T, $+1$, the rotation of the output brush of the interpolating device being linearly related to $t$. If $x_2$ is the value of $x$ at $t=0$ and $d$ is as shown in the figure, then it can be shown that $$X = x_2 + (x_3 - x_1)\frac{T}{2} + (x_1 - 2x_2 + x_3)\frac{T^2}{2} \quad (1)$$

Therefore $$x_2 = \frac{x_1 + x_3}{2} + \frac{d}{1 - T^2} \quad (2)$$

where $$d = X - \frac{x_1 + x_3}{2} - \frac{x_3 - x_1}{2} \cdot T$$

Figure 2:
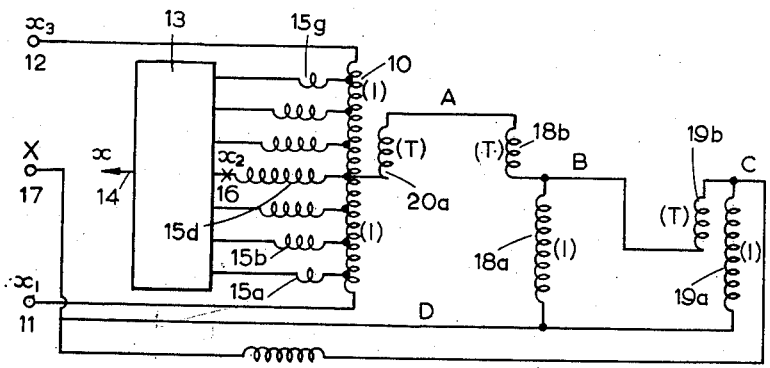
FIGURE 2 illustrates the general details of an interpolating arrangement according to one example of the invention.

Provided that T does not depart too far from zero, the circuit shown in FIGURE 2 will derive $x_2$ so that the quadratic interpolating device which forms part of the circuit operates in the balanced mode.

Referring to FIGURE 2, reference 10 represents an auto-transformer having at opposite ends two input terminals 11 and 12. Tappings on the auto-transformer lead to a linear sub-interpolator 13 as described in the specification of United States Patent No. 2,928,604. In one form of linear sub-interpolator there is, for example, a slow speed switch comprising a series of contact studs connected to the leads from the auto-transformer 10, and brush means moveable to represent $t$ and to derive voltages from two adjacent studs of the switch. These voltages are applied to opposite ends of a linearly tapped auto-transformer, the taps on which are connected to the studs of a high speed switch, which studs are scanned by a brush connected to the brush means of the low speed switch. The final output of the arrangement is derived from the latter brush and the output lead is denoted in the drawing by the reference 14, the output representing $x$ for the value of $t$ corresponding to the slow and high speed brush means. The leads from the tapping points on the auto-transformer 10 to the linear sub-interpolator 13 include a series of transformer windings 15a to 15g which are inductively coupled together and which have numbers of turns related in accordance with a quadratic law, the lead including the winding 15d being connected to the mid-point of the auto-transformer 10. As so far described, the circuit is the same as one of the constructions described in the specification of United States Patent No. 2,928,604, and it functions to produce quadratic interpolation of three reference signals applied at the terminals 11 and 12 and at the end 16 of the winding 15d, assuming that the input signals correspond to an equally divided interval of the variable $t$.

For purposes of description it will be assumed that alternating signals having amplitudes corresponding to $x_1$ and $x_3$ are applied to the terminals 11 and 12. The circuit has a third input terminal 17 to which is applied (it will be assumed) an alternating signal having an amplitude representing X. The input signals therefore correspond to values of the variable the intervals between which are in a different ratio from that for which the interpolating means 10, 13 and 15 is adapted. The signal X is applied to one end of two auto-transformers composed of ratio arms 18a, 18b and 19a, 19b interconnected as shown. The other end of the auto-transformer 18a, 18b is connected to one end of a ratio arm 20a which has its other end connected to the mid-point of the auto-transformer 10, so that 20a together with the auto-transformer 10 constitutes another auto-transformer. The terminal 17 is also connected to the intermediate point of the auto-transformer 19a, 19b through a winding 15h which is inductively coupled to the windings 15a to 15g. The ratio arms 18a and 19a have fixed numbers of turns, whilst the arms 18b, 19b and 20a are variable to represent T as will be described subsequently. The numbers of turns on the ratio arms are related as the values shown adjacent the respective arms, the scale being that of the abscissae in FIGURE 1. Thus for example if the number of turns on one-half the auto-transformer 10 corresponds to a unit interval in $t$ then the assigned number of turns on the arm 20a corresponds to T, and similarly in the case of the other ratio arms. The voltage at the mid-point of the auto-transformer 10, measured with respect to ground is $$\frac{x_1+x_3}{2}$$

whereas the voltage difference between the ends of the auto-transformer is $x_3-x_1$. The voltage induced across the ratio arm 20a is therefore $$\frac{x_3-x_1}{2} \cdot T$$

From the foregoing considerations it is apparent that the voltage between points D and A is given by $$X - \frac{x_1+x_3}{2} - \frac{x_3-x_1}{2} \cdot T = d$$

The voltage between D and B is given by $$\frac{d}{1+T}$$

and on condition that 19b is wound in the opposite sense to 18b the voltage between D and C is given by $$\frac{d}{(1+T)(1-T)} = \frac{d}{1-T^2}$$

This voltage appears across the winding 15h and is injected across the winding 15d and all the other windings in proportion to their numbers of turns, the number of turns on 15h being equal to the number of turns on 15d. Now the voltage at the mid-point of the auto-transformer 10 is $$\frac{x_1+x_3}{2}$$

so that the voltage at the point 16 is $x_2$, as required by Equation 2 to produce balanced operation of the quadratic interpolator, that is the signals $x_1$, $x_2$ and $x_3$ have the correct interval-ratio of the variable $t$ for interpolation by the means 10, 13 and 15.

Thus it will be appreciated that FIGURE 2 shows an interpolating arrangement comprising interpolating means having at least three input terminals, comprising the terminals of 10 and terminal 16, output terminals comprising the leads connected to the windings 15a, 15b . . . 15g, and transformer means comprising 10 and 15a to 15g interconnecting the input and output terminals, the transformer winding portions between the input terminals 12 and 16 and the input terminals 16 and 11 being predetermined to cause the interpolating means to respond to applied alternating signals representing values of a function at three spaced values, $x_1$, $x_2$ and $x_3$ (FIGURE 1) of a function, the intervals between which values are in predetermined relationship (equal in FIGURE 1), to produce alternating signals representing intermediate values of said function. In addition, there is provided a source, namely terminals 11, 12 and 17, of alternating signals representing values $x_1$, X and $x_3$ of said function corresponding to a different interval ratio of the variable T, and means comprising transformer windings 15h, 18a, 18b, 19a, 19b and 20a for deriving from the input signals a modified set of input signals representing values of the function corresponding to the said predetermined interval ratio and means for applying the modified signals to said input terminals. In the present apparatus, only one of the said input signals, namely that applied to 16 is modified but obviously in general all the input signals may, if desired, be modified to provide the predetermined interval ratio for input signals to the interpolating means.

Figure 3:
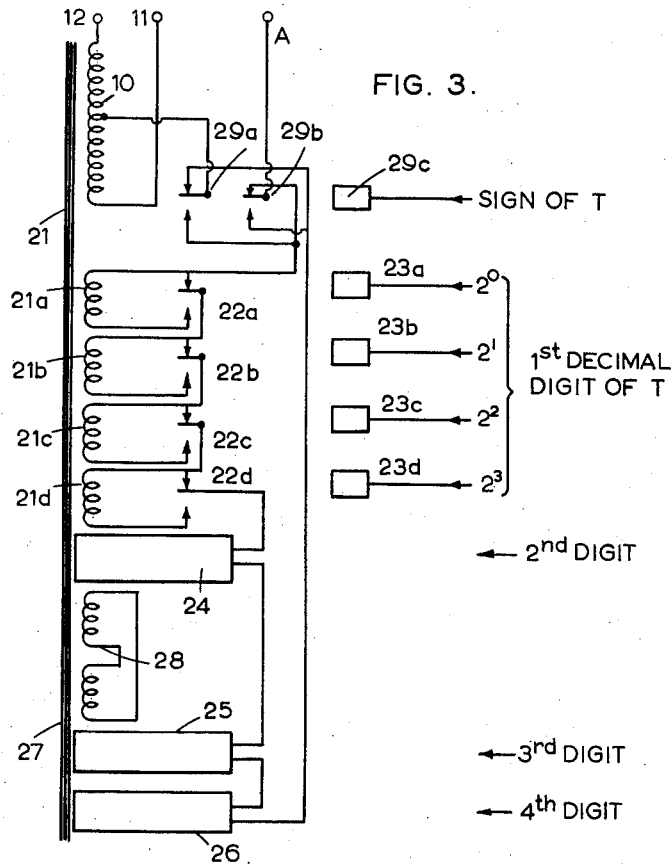
FIGURE 3 illustrates a construction which can be used for variable ratio arms employed in FIGURE 2, and FIGURES 4 and 5 illustrate other forms of interpolating arrangements according to the invention.

In applications of the arrangements shown in FIGURE 1 each value of T may be expressed in a binary-decimal code, the value of T varying with X. FIGURE 3 illustrates a construction for the ratio arm 20a, whereby the number of turns of the ratio arm can be varied in response to the signals derived from the record and denoting the value of T. The reference 21 represents a toroidal core on which is wound the auto-transformer 10. On the same core a series of four transformer windings 21a to 21d are wound and these windings have numbers of turns which are related as successive powers of two, so that the winding 21b has twice the number of turns of the winding 21a and so on. The windings 21a to 21d are associated with switches 22a to 22d which are operated by relays 23a to 23d to which are applied in parallel pulse code signals representing the four binary digits which represent the first or highest order decimal digit of T, the pulse code signals being derived from the tape or other record by suitable tape reader. The switches 22a to 22d and the corresponding relays are arranged in the manner described, for example, in the complete specification of United States application, Serial No. 459,794, now Patent No. 2,949,600, and when a group of binary digital pulses are applied to the relays the corresponding switches are set in the binary pattern corresponding to the applied signals. The switches then connect in a series chain a selection of the windings 21a to 21d such that the number of turns effective on the toroid corresponds to the appropriate decimal digit. The rectangles 24, 25 and 26 denote units consisting of windings, switches and relays similar to that described and adapted for setting up the second, third and fourth decimal digits of T, the units 25 and 26 being applied to a toroidal core 27 separate from the core 21, but magnetically coupled thereto in the appropriate ratio by the coupling link 28, so that unduly large numbers of turns need not be used. In the arrangement shown, T is set up with the accuracy obtainable by four decimal digits, but a greater or lesser number of digits may be used as the situation demands. When a value of T has been set up, the effective windings in each of the binary-decimal units are all connected in a single series chain extending between the fixed contacts of two switches 29a and 29b. These switches are controlled by a relay 29c which receives input signals representing the sign of T and when these switches are in one condition (say that shown in the drawings) the sense of the ratio arm 20a has one sign in relation to the auto-transformer 10, whereas when the switches 29a and 29b are in the opposite condition the sense of the ratio arm 20a in relation to the auto-transformer 10 is reversed.

The ratio arms 18b and 19b are of the same construction as the ratio arm 20a but switches such as 29a and 29b are not required provided that the arms 18b and 19b are wound in mutually opposite senses. The same relays, such as 23a to 23d in FIGURE 3, can be used to control the number of turns in all the ratio arms. Moreover in some cases it may be advantageous to replace T by $$S = 1 + T$$

so as to avoid the need of a sign digit for T.

Figure 4:
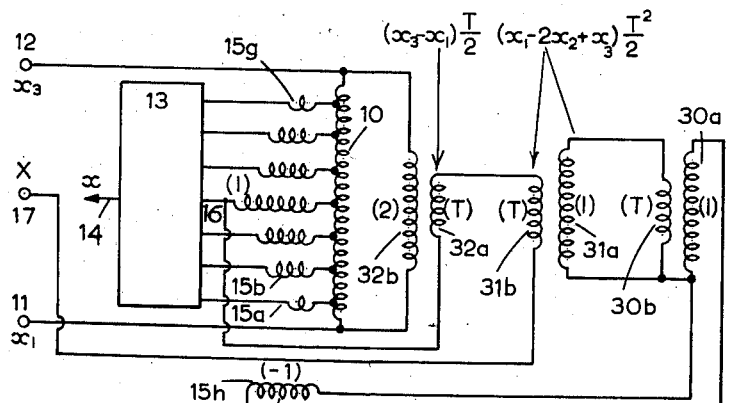

The arrangement shown in FIGURE 4 is adapted to synthesise $x_2$ directly from Equation 1 above. The arrangement is generally similar to FIGURE 2, and corresponding parts in FIGURES 2 and 4 are denoted by the same reference numerals and the same notation is adopted to indicate the numbers of turns on the ratio arms. The arrangement of FIGURE 4 requires, in addition to the quadratic interpolator, the use of ratio arms 30a, 30b, 31a, 31b, 32a, 32b, each pair of ratio arms forming a transformer having an individual toroidal core. Assume that the voltage at the point 16 is $x_2$. Bearing in mind that, in this example, 15h is wound in negative sense with respect to the windings 15a to 15g, the voltage induced across the winding 15h is then $$\frac{x_1 + x_3 - x_2}{2}$$

and this is multiplied by $T^2$ by the ratio arms 30a, 30b, 31a and 31b. Therefore the voltage across the arm 31b is $$(x_1 - 2x_2 + x_3)\frac{T^2}{2}$$

Moreover, the voltage across the arm 32a is $$(x_3 - x_1)\frac{T}{2}$$

Therefore the voltage between the point 16 and the terminal 17 is $x_2 - X$, as can be seen by reference to Equation 1 above, so that the voltage at the point 16 is $x_2$ as assumed and now justified.

Figure 5:
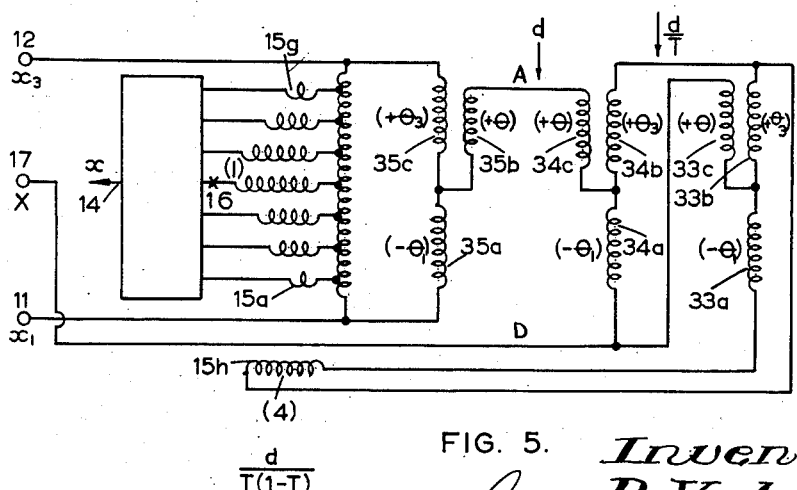

The arrangement shown in FIGURE 5 works on data points only, that is it employs implicitly both co-ordinates of each input point, and it will be assumed that $x$ is to be interpolated against $\theta$ and that the points represented by the three input signals are $(\theta_1, x_1)$, $(\theta, X)$, $(\theta_3, x_3)$ where the interval $\theta_1\theta$ does not necessarily equal the interval $\theta\theta_3$. Letting the range $\theta_1$, $\theta_3$ correspond linearly to $0 \leqslant t \leqslant 1$ with the ratio of $\theta_1\theta$ to $\theta_1\theta_3$ equal to T, and using $d$ as before, it can be shown that $$X = x_1 - (3x_1 - 4x_2 + x_3)T + 2(x_1 - 2x_2 + x_3)T^2 \quad (3)$$

Therefore $$x_2 = \frac{x_1 + x_3}{2} + \frac{d}{4T(1 - T)} \quad (4)$$

provided that T does not depart too far from ½ and that $\theta_1\theta_3$ does not depart too far from a predecided nominal value. The arrangement of FIGURE 5 operates on the basis of Equation 4 and in addition to the quadratic interpolator comprises ratio arms 33a, 33b, 33c and 34a, 34b, 34c and 35a, 35b, 35c, the arms 33a, 33b, 33c being wound on one core, the arms 34a, 34b and 34c being wound on another, and so on. The numbers of turns on the ratio arms are denoted by the symbols in brackets beside the arms, and in this case the arms must be sign-sensitive as described in the case of 20a.

In FIGURE 5 it can be shown, by reasoning similar to that adopted in the case of FIGURE 2, that the voltage between the points A and D is representative of $d$. The ratio across 34a, 34b and 34c multiply this voltage by $\theta_1\theta_3/\theta_1\theta$, namely, $1/T$ thereby producing $d/T$. The ratio arms 33a, 33b and 33c then multiply $d/T$ by $\theta_1\theta_3/\theta\theta_3$, that is by $$\frac{\theta_1\theta_3}{\theta_1\theta_3 - \theta_1\theta}$$

which reduces to $$\frac{1}{1 - T}$$

The voltage across the winding 15h is therefore $d/T(1-T)$ which is injected across the winding 15d, reduced in amplitude by a factor of four. The voltage at the point 16 therefore represents $d/4T(1-T)$ superimposed on the voltage at the mid-point of the winding 10, namely $$\frac{x_1 + x_3}{2}$$

so that the voltage $x_2$ is produced at the point 16 as required.

It is also possible to modify FIGURE 5 so as to solve Equation 3 directly, such an arrangement bearing the same relationship to FIGURE 5 as FIGURE 4 does to FIGURE 2.

The invention is applicable to arrangements for producing higher than quadratic interpolation, in which case more than three reference signals are required to produce interpolation.

What I claim is:

An interpolating arrangement comprising first, second and third input terminals; a plurality of output terminals; interpolating means interconnecting said input terminals and said output terminals, said interpolating means comprising two transformers intercoupling said input and output terminals, the turns ratios of said two transformers being predetermined for interpolation according to a quadratic function, in response to alternating signals applied to said input terminals and having amplitudes representing values of a function corresponding to three values of the variable of the function, the intervals between the first and second and between the second and third of which values of the variable are in predetermined ratio, whereby said interpolating means produces at said output terminals alternating signals, the amplitudes of which correspond to interpolated values of said function; a source of first, second and third alternating signals having amplitudes which represent respectively values of the function for three given values of the variable of said function, the interval between the first and second and between the second and third of which given values of the variable are in different ratio from said predetermined ratio; other transformer means comprising a plurality of transformers the turns ratios of which are predetermined to derive from the signals from said source a further alternating signal representing the value of said quadratic function for a value of said variable which divides in said predetermined ratio the interval between the first and third given values of the variable; and means for applying said first, said further and said third alternating signals to said first, second and third input terminals respectively.

(References on following page)

References Cited in the file of this patent

UNITED STATES PATENTS

| | | |
|---|---|---|
| 2,662,147 | Wilentchik | Dec. 8, 1953 |
| 2,781,967 | Spencer | Feb. 19, 1957 |
| 2,833,110 | Spencer et al. | Apr. 21, 1959 |
| 2,894,186 | Cail et al. | July 7, 1959 |
| 2,928,604 | Dudman et al. | Mar. 15, 1960 |
| 2,929,555 | Spencer et al. | Mar. 22, 1960 |

FOREIGN PATENTS 701,038    Great Britain _____ Dec. 16, 1953

OTHER REFERENCES

Electronic Engineering (Mynall) June 1947, pages 178 and 179.